United States Patent
Nuzman et al.

(10) Patent No.: US 8,055,134 B2
(45) Date of Patent: Nov. 8, 2011

(54) OPTICAL TELECOMMUNICATIONS NETWORK AND METHOD

(75) Inventors: Carl Jeremy Nuzman, Union, NJ (US); Debasis Mitra, Summit, NJ (US); Iraj Saniee, New Providence, NJ (US); Gordon Wilfong, Bedminster, NJ (US)

(73) Assignee: Alcatel Lucent, Paris (FR)

(*) Notice: Subject to any disclaimer, the term of this patent is extended or adjusted under 35 U.S.C. 154(b) by 584 days.

(21) Appl. No.: 12/178,104

(22) Filed: Jul. 23, 2008

(65) Prior Publication Data
US 2010/0021165 A1   Jan. 28, 2010

(51) Int. Cl.
*H04B 10/02* (2006.01)
*H04B 10/20* (2006.01)
*H04J 14/00* (2006.01)

(52) U.S. Cl. ............................. 398/75; 398/58; 398/175
(58) Field of Classification Search ............. 398/51–64, 398/74, 75, 173, 175–177, 115, 125
See application file for complete search history.

(56) References Cited

U.S. PATENT DOCUMENTS

| 6,798,993 B1* | 9/2004 | Adams et al. .................. 398/74 |
| 2002/0063927 A1* | 5/2002 | Ofek et al. .................... 359/128 |
| 2006/0127093 A1* | 6/2006 | Park et al. ...................... 398/75 |

* cited by examiner

*Primary Examiner* — Dalzid Singh
(74) *Attorney, Agent, or Firm* — Brosemer, Kolefas & Assoc.

(57) ABSTRACT

An optical communications network architecture and associated method which employs time and wavelength-interleaving for homing between nodes/satellites and hubs and for grooming, while employing wavelength-division-multiplexed wavelength circuits between hubs without requiring cross-connects or routers therebetween.

14 Claims, 10 Drawing Sheets

OPTICAL TELECOMMUNICATIONS NETWORK AND METHOD

FIELD OF THE INVENTION

This invention relates generally to the field of optical communications and in particular to an optical telecommunications network employing time and wavelength interleaving between satellites (tier 2 nodes) and hubs (tier 1 nodes), in conjunction with wavelength transport between tier 1 nodes.

BACKGROUND OF THE INVENTION

As communications networks employing optical fiber and wavelength-division-multiplexing technologies (WDM) continue to evolve and carry an ever-increasing volume and variety of traffic between increasing numbers of individual nodes, network designers are faced with significant network design problems such as the management of their growth. Consequently architectures and/or methods that provide a more convenient framework for their optimization, graceful growth, and evolution would represent an advance in the art.

SUMMARY OF THE INVENTION

An advance is made in the art according to the principles of the present invention directed to an optical communications network architecture and associated methods employing time and wavelength interleaving between tier 2 nodes and tier 1 nodes, while employing wavelength-division-multiplexed circuits between the tier 1 nodes. Advantageously, and in sharp contrast with prior-art approaches—communications networks according to the present invention do not utilize tier 1 cross-connects.

BRIEF DESCRIPTION OF THE DRAWING

A more complete understanding of the present invention may be realized by reference to the accompanying drawings in which.

DETAILED DESCRIPTION

Figure 1:
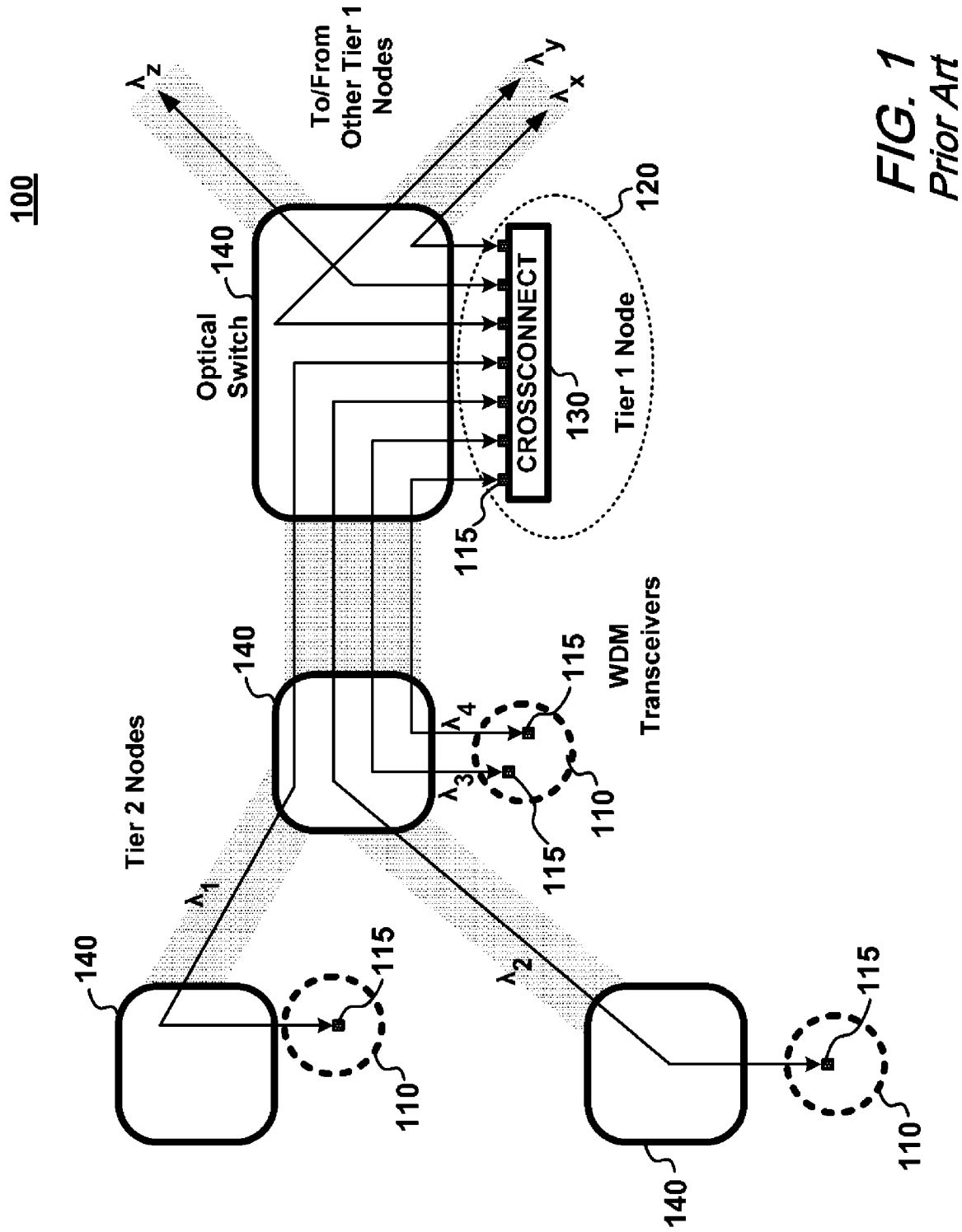
FIG. 1 is a schematic diagram of a prior-art communications network employing WDM grooming in a two-tier arrangement.

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

We begin by noting that since "satellite" and "hub" are terms which are oftentimes misused in the art, we have used the terms "tier 1" instead of hub and "tier 2" instead of satellite. In addition—and as used herein—in a two-tier hierarchical network, the set of nodes in the network are divided into two sets: the tier 1 nodes and the tier 2 nodes.

Tier 2 nodes are configured to communicate data to and from tier 1 nodes. Typically, each tier 2 node is configured to communicate with a small number of tier 1 nodes. In this situation, we say that the tier 2 node is "homed" to each such tier 1 node. The tier 2 nodes, and the communication links that enable such nodes to communicate with tier 1 nodes, together are referred to as a "tier 2 network". A tier 1 network—by comparison—generally comprises a number of tier 1 nodes together with a set of communication links that enable the tier 1 nodes to communicate with one another.

A given tier 2 node may be able to communicate directly with a small number of tier 2 nodes. However, typically a tier 2 node communicates with another tier 2 node through a three step process. First, data is sent through a tier 2 network from an originating tier 2 node to an associated tier 1 node. Second, data is sent through a tier 1 network from the tier 1 node to a second tier 1 node associated with a destination tier 2 node. Finally, data is sent through the tier 2 network from the second tier 1 node to the destination tier 2 node. With respect to the originating tier 2 node, the first tier 1 nodes is called the local tier 1 node, and the second tier 1 node is called a remote tier 1 node. Likewise, with respect to the destination tier 2 node, the first tier 1 node is called a remote tier 1 node, and the second tier 1 node is called the local tier 1 node.

Turning now to FIG. 1 there is shown a schematic of a prior-art communications network employing WDM grooming in a two-tier configuration. As shown in this FIG. 1, the network 100 includes three tier 2 nodes 110 in optical communication with tier 1 node 120 via one or more dedicated wavelength circuits $\lambda_1$, $\lambda_2$, $\lambda_3$, $\lambda_4$ any or all of which may be routed to the tier 1 node 120 through the effect of one or more optical switches 140. The tier 1 node 120—in turn—communicates with other tier 1 nodes (not specifically shown in FIG. 1) via cross-connect 130. As a result, data communications conducted via any of the wavelength circuits $\lambda_1$, $\lambda_2$, $\lambda_3$, $\lambda_4$ may be selectively further connected via cross-connect 130 to hub-to-hub wavelength circuits $\lambda_X$, $\lambda_Y$, $\lambda_Z$.

Although not specifically shown in FIG. 1, one or more of the tier 2 nodes 110 may be multiply-connected (homed) to other tier 1 nodes in addition to tier 1 node 120. In such configurations, each tier 2 node 110 may be optically connected to one or more tier 2 nodes 120 via one or more optical switches 140, which—as those skilled in the art will readily appreciate—generally route optical signals as a function of their wavelength.

As shown in FIG. 1, the tier 2 nodes 110 utilize one or more transceivers 115 to optically communicate. In those situations where a tier 2 node 110 employs more than one transceiver 115, each of the individual transceivers will utilize a different wavelength.

As used herein, tier 2 nodes are devices that are capable of sending, or receiving data/information over a communications channel. A tier 2 node is a connection point, either a redistribution point or an end point for data transmission. Oftentimes, a node has the capability to recognize and process and forward transmissions to other nodes. In network topology discussions, the term may refer to an active device which is situated at a point of branching of physical connections, or terminating a physical connection, where messages can be transmitted, received or forwarded.

Tier 1 nodes on the other hand, are devices which terminate a number of circuits to/from tier 2 nodes and/or to/from other tier 1 nodes.

Cross-connects, or digital cross-connect (DCS), are network systems oftentimes employed in telephone or other circuit-based networks that allows lower-level time-division-multiplexed bit streams such as DS0 bit streams to be rearranged and interconnected among higher-level TDM signals such as DS1 bit streams. In network environments such as that depicted in FIG. 1, DCS devices may be used for grooming the telecommunications traffic as well as switching traffic from one circuit to another in the event of a failure. Importantly, while DCS devices "switch" traffic, they are not packet switches. Instead they switch circuits, not packets and the circuit arrangements they are used to manage may persist for very long periods of time. In sharp contrast, packet switches may route every packet differently, and may operate on a micro- or millisecond time frame for each packet "connection".

As used herein, a crossnnect is sometimes called a grooming crossconnect. Those skilled in the art will readily appreciate that a router may be used in a similar manner. In general a crossconnect is a device which has multiple input and output ports and which is capable of communicating data from its input ports to its output ports. It is called a grooming cross-connect if the data arriving at an input port comprises multiple sub-streams that have been multiplexed together and if the crossconnect is capable of routing different data sub-streams to different output ports (instead of necessarily routing all data from one input port to one output port). As we shall see and for the purposes of the present invention, our inventive network and associated method works equally well regardless of whether streams are multiplexed using time-division circuits (grooming crossconnect) or statitistical multiplexed packets (routers)

Conventionally configurations such as that shown in FIG. 1 are generally known as two-tier, wherein tier-2 entities comprise "nodes/satellites" while tier 1 entities comprise "hubs". As those skilled in the art will appreciate, when the number of tier 2 nodes in a network such as that shown in FIG. 1 is large, such "tiering", coupled with "grooming" is oftentimes employed by network designers to aid the management of that network.

As generally understood, "traffic grooming" or simply "grooming", is a process of grouping a number of small telecommunications flows into larger ones which may then be processed as single entities. For example, in a network using both time-division multiplexing and wavelength-division multiplexing, two flows which are destined for a common node may be placed on the same wavelength—for example—allowing them to be dropped by a single add-drop-multiplexer device. Oftentimes, the underlying motivation for grooming is to minimize cost and maximize bandwidth utilization.

At this point, it becomes apparent that as this simple network configuration shown in FIG. 1 grows even modestly—say to 80 tier 2 nodes and 20 tier 1 nodes interconnecting same, and if for example each tier 2 node handles the aggregate traffic from a moderate sized city, the total bandwidth requirements for the tier 1 cross-connect would be on the order of 2 Tb/s "facing" the tier 2 nodes and another 2 Tb/s facing the other tier 1 nodes. Given current technologies, scaling such enormous requirements upward is a significant engineering/planning endeavour.

As a result, and according to an aspect of the present invention, an architectural arrangement is provided which eliminates the tier 1 cross-connects and a number of the transceivers through the use of time and wavelength interleaved networking for homing between tier 2 nodes and tier 1 nodes and for grooming, while employing wavelength-division-multiplexed wavelength circuits among and between tier 1 nodes. Advantageously, no cross-connect or router is used at each tier 1 node.

According to an aspect of the invention, on tier 1-tier 2 links, tunable lasers are employed to transmit fixed-length data payloads in a scheduled manner. The transmission wavelength of the payload is used to encode a desired tier 1 node interface, wherein each tier 1 node interface has already been associated with a tier 1 node-to-tier 1 node wavelength circuit.

Figure 2:
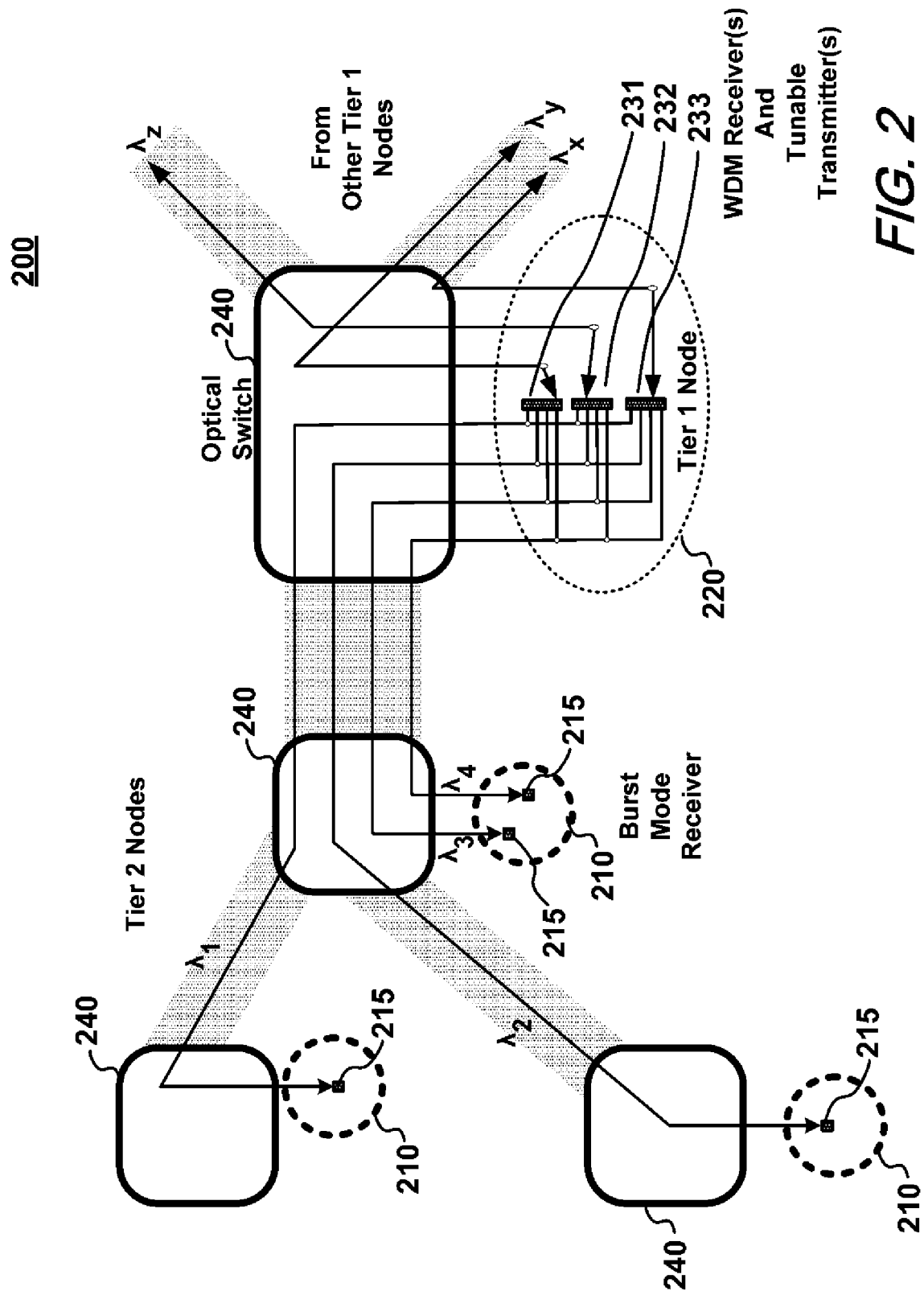
FIG. 2 is a schematic diagram of a communications network showing the downstream operation according to the present invention.

Turning our attention now to FIG. 2, there is shown a schematic of an exemplary telecommunications network 200 according to an aspect of the present invention depicting downstream operation of telecommunications traffic. As shown in FIG. 2, the network 200 includes three tier 2 nodes 210 in optical communication with tier 1 node 220 via one or more multi-point to point wavelength channels $\lambda_1$, $\lambda_2$, $\lambda_3$, $\lambda_4$ any or all of which may be routed from the tier 1 node 220 to the tier 2 nodes 210 through the effect of one or more optical switches 240. Each of the tier 2 nodes has one or more burst-mode receivers 215, with which the particular tier 2 node receives bursts at its respective dedicated wavelength on its multi-point to point wavelength channel. Tier 1 node 220 receives communication from other tier 1 nodes (not specifically shown) and—the data sent on each of the wavelength circuits $\lambda_1$, $\lambda_2$, $\lambda_3$, $\lambda_4$ reaches the tier 1 nodes 220 via tier 1 node-to-tier 1 node wavelength circuits $\lambda_X$, $\lambda_Y$, $\lambda_Z$.

In contrast to the cross-connect 130 configuration shown previously in FIG. 1, tier 1 node-to-tier 1 node hub communication according to an aspect of the present invention employs a set of transceivers 231, 232, 233, each containing a WDM receiver and tunable transmitter. As such, each one of the four tier 2 nodes receivers 215 is assigned a particular wavelength of light with which to receive communications from the tier 1 node 230. In this exemplary configuration of FIG. 2, three tunable transmitters in the transceivers 231, 232, 233 are used to send bursts of data in periodic schedules. The wavelength of the burst(s) encode the desired destination (tier 2 nodes) for each burst. Accordingly, signals are passively combined in the tier 1 node 220, and any contention is avoided as a result of the particular scheduling.

Although not specifically shown in FIG. 2, one or more of the tier 2 nodes 210 may be connected (homed) to other tier 1 nodes such as tier 1 node 220. In such configurations, each tier 2 node 210 may be optically connected to the tier 1 node 220 via one or more optical switches 240.

Figure 3:
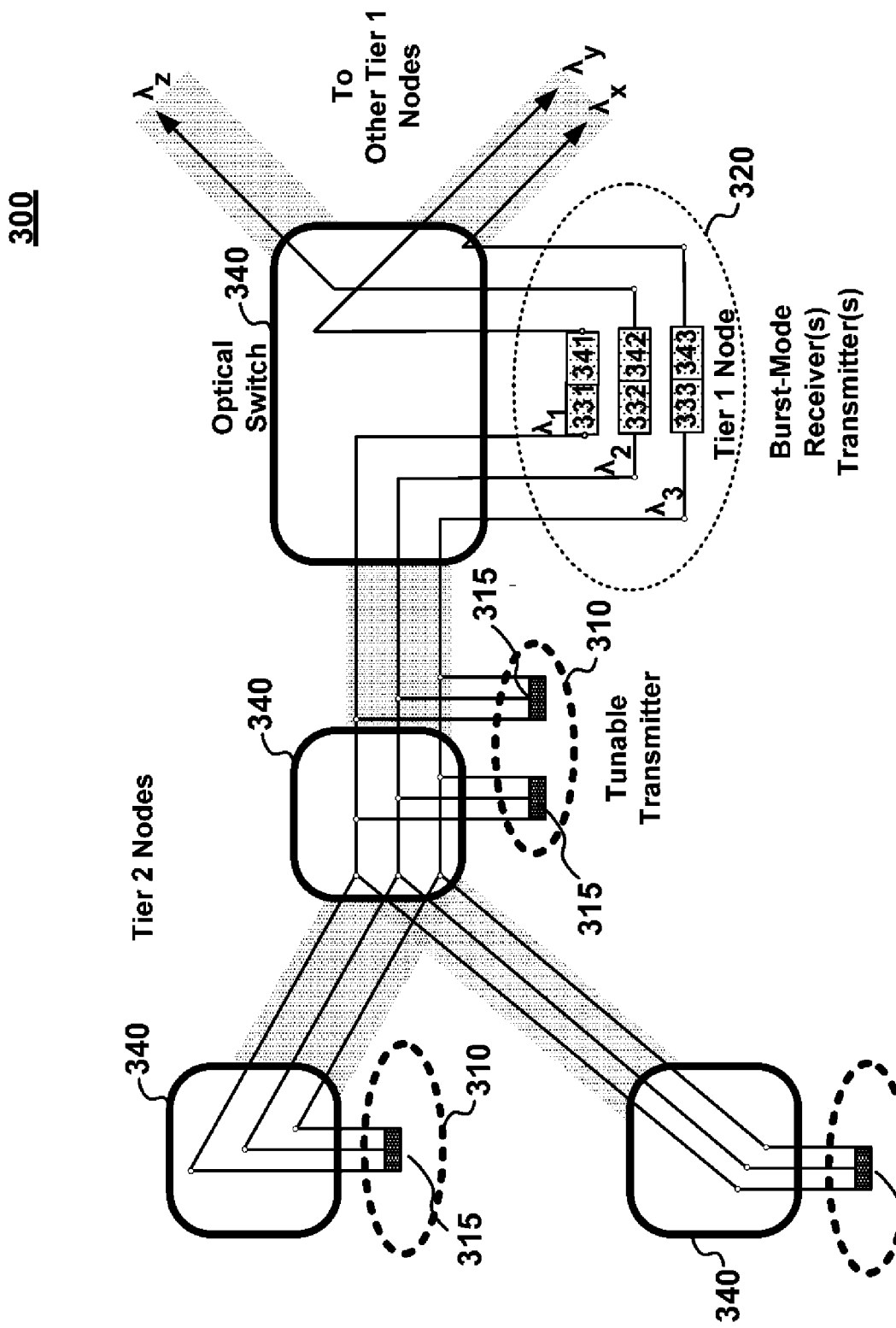
FIG. 3 is a schematic diagram of the communications network of FIG. 2, showing the upstream operation according to an embodiment of the present invention.

Turning now to FIG. 3, there is shown—according to another aspect of the present invention—upstream operational aspects 300 of a network such as that shown previously in FIG. 2. More particularly, and with reference to FIG. 3, during upstream operation of network 300, four tunable lasers 315—one or more for each of the tier 2 nodes—tune to any of the wavelengths (in this example, three) employed in order to access the tier 1 node burst receivers 331, 332, 332. Each tier 1 burst receiver is associated with a transmitter 341, 342, 343 of a tier 1-to-tier 1 wavelength circuit. For example, in this FIG. 3, data that is transmitted upstream from any tier 2 node on wavelength circuit $\lambda_2$, is received at tier 1 receiver 332 and then further transmitted through the effect of transmitter 342 via tier 1-to-tier 1 wavelength circuit $\lambda_Z$.

At this point, a number of advantageous distinctions emerge regarding the operation and architecture of a network implemented according to aspects of the present invention. In particular, the functionality of a network so implemented is at least as functional as a prior-art, multi-tiered configuration. Of further advantage and as will become increasingly apparent to those skilled in the art, sub-wavelength switching is offloaded from the electronic domain to the optical domain using passive optics in a preferred embodiment to switch wavelength circuits. Also, additional transceivers may be added at tier 1 nodes and tier 2 nodes as the network evolves and grows, thereby simplifying growth concerns/considerations. Tier 2 nodes operating according to the present invention may—if needed—connect to older, prior-art tiered networks. Lastly, time and wavelength interleaving are used for local transport, while long reach WDM signals may be used to connect to distant tier 1 nodes and the use of tunable receivers provides a particularly efficient multi-cast arrangement.

Networks constructed according to certain aspects of the present invention afford network designers and operators particularly flexible multi-casting. For example, with simultaneous reference to FIG. 2 and FIG. 3, it is notable that reversing the direction of the wavelength channels depicted in these two figures results in schemes using fixed transmitters and tunable receivers thereby permitting upstream, tier 2-to-tier 1 multicasting and downstream tier 1-to-tier 2 multicasting. And while these figures show only a single tier 1 node, as noted previously each tier 2 node may advantageously home onto multiple tier 1 nodes—thereby producing a "survivable" two-tier architecture. In fact, a single tier 2 node may simultaneously home to one tier 1 node in a manner compatible to the prior art, while homing to other(s) according to the present invention—as illustratively shown in FIG. 2 and FIG. 3.

Figure 4A:
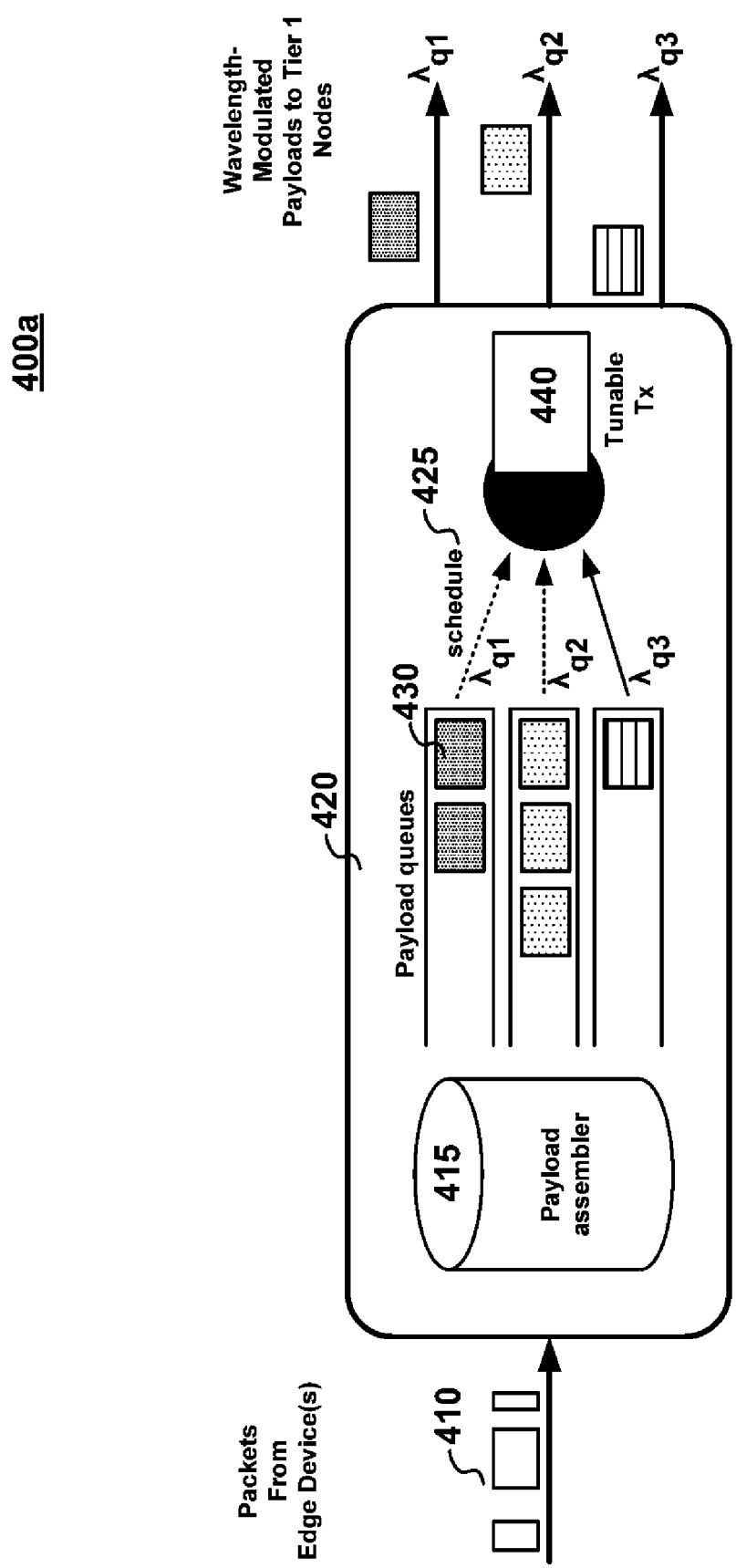
FIG. 4(A) is a schematic diagram of a transceiver at a tier 2 node in a communications network showing its upstream operation and components according to an embodiment of the present invention.
Figure 4B:
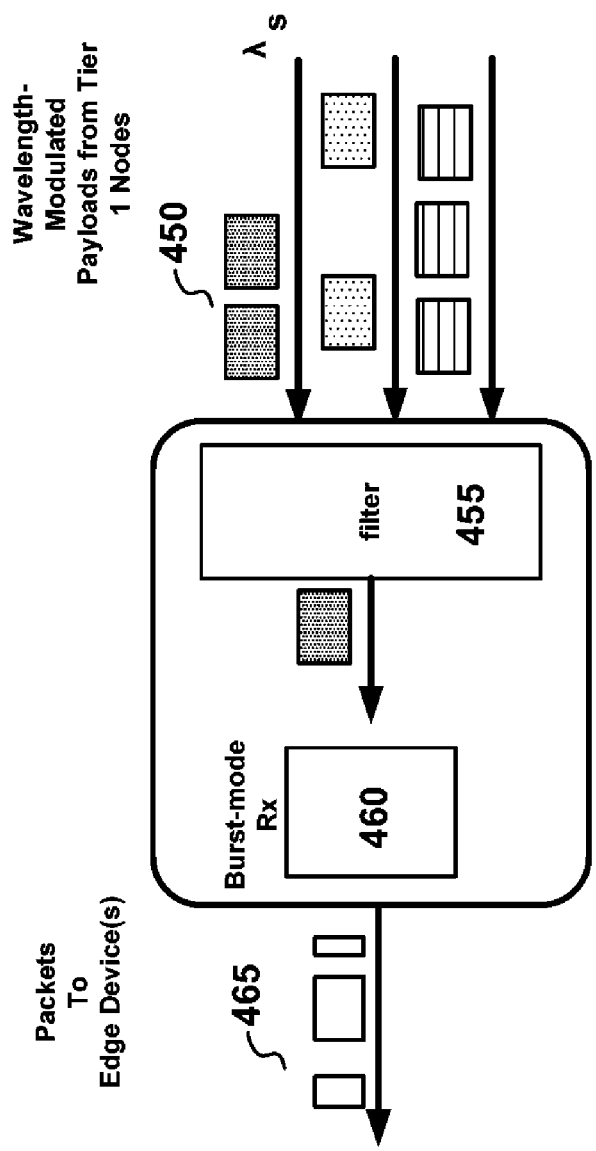
FIG. 4(B) is a schematic diagram of a transceiver at a tier 2 node in a communications network showing its downstream operation and components according to an embodiment of the present invention.

FIG. 4(A) and FIG. 4(B) show—in schematic block diagram form—the functional components of an illustrative transceiver 400($a$) for a tier 2 node—according to an aspect of the invention. As shown, the transceiver 400($a$) includes a payload assembler 415 and burst transmitter 440. Accordingly, received packets 410 from an edge router (not shown) or other data source, are directed into the payload assembler 415. The payload assembler 415 sorts the received packets into a number of destination-based queues 420 whereby all packets in a given queue are to be forwarded to the same remote tier 1 node (not shown).

In one embodiment according to the invention, queued packets are assembled into payloads 430—fixed size data units that take up one time slot. Then, with each successive slot a tunable transmitter 440 receives a payload from one of the queues—as specified by the scheduler 425 and transmits it to the local tier 1 node (not shown) using a wavelength associated with its queue. In a representative system, a number of passive combiners and wavelength selective devices combine and route signals from a number of satellites/nodes toward the designated transceiver at the local tier 1 node. In turn, each transceiver at the local tier 1 node is dedicated to forwarding data to a specific remote tier 1 node.

With reference now to FIG. 4(B), there is shown a tier 2 node receiver 400($b$) operation and components. As shown, the receiver 400($b$) includes a wavelength-selective filter 455 and a burst-mode receiver 460. More particularly, wavelength modulated payloads 450 from a local tier 1 node are received and filtered through the effect of the wavelength-selective filter 455. The filter 455 ensures that only payloads transmitted on specified wavelength(s) reach the burst-mode receiver 460. In this representative embodiment, the burst-mode receiver 460 uses a preamble sequence transmitted with each payload to lock onto its particular timing and amplitude and then demodulates the received payload. Such demodulated packets are relayed to edge devices, such as routers, as appropriate 465.

Figure 5A:
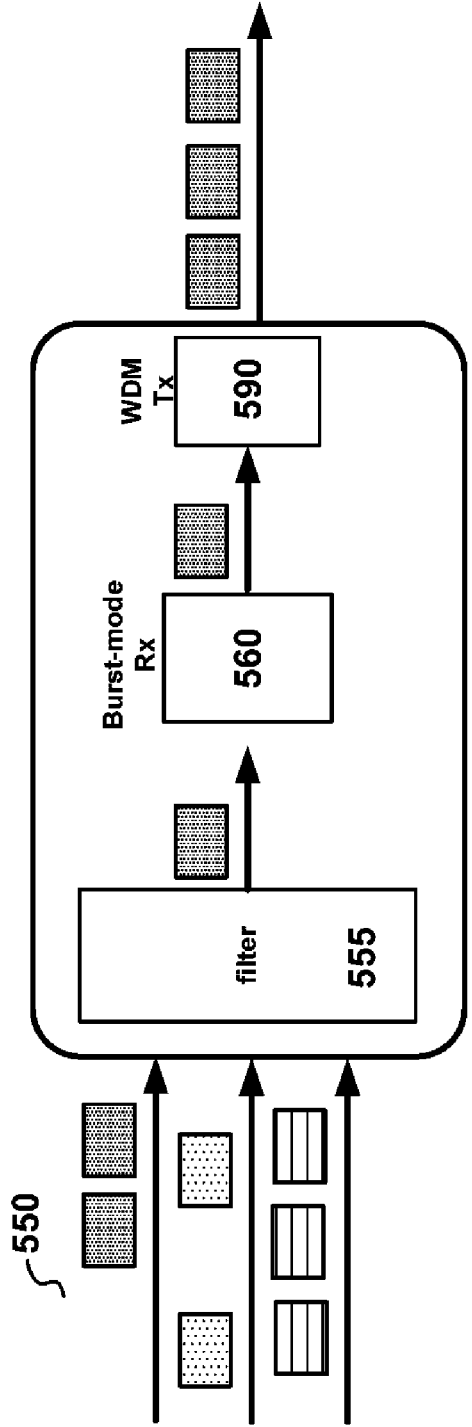
FIG. 5(A) is a schematic diagram of a transceiver at a tier 1 node in a communications network showing its upstream operation and components according to an embodiment of the present invention.
Figure 5B:
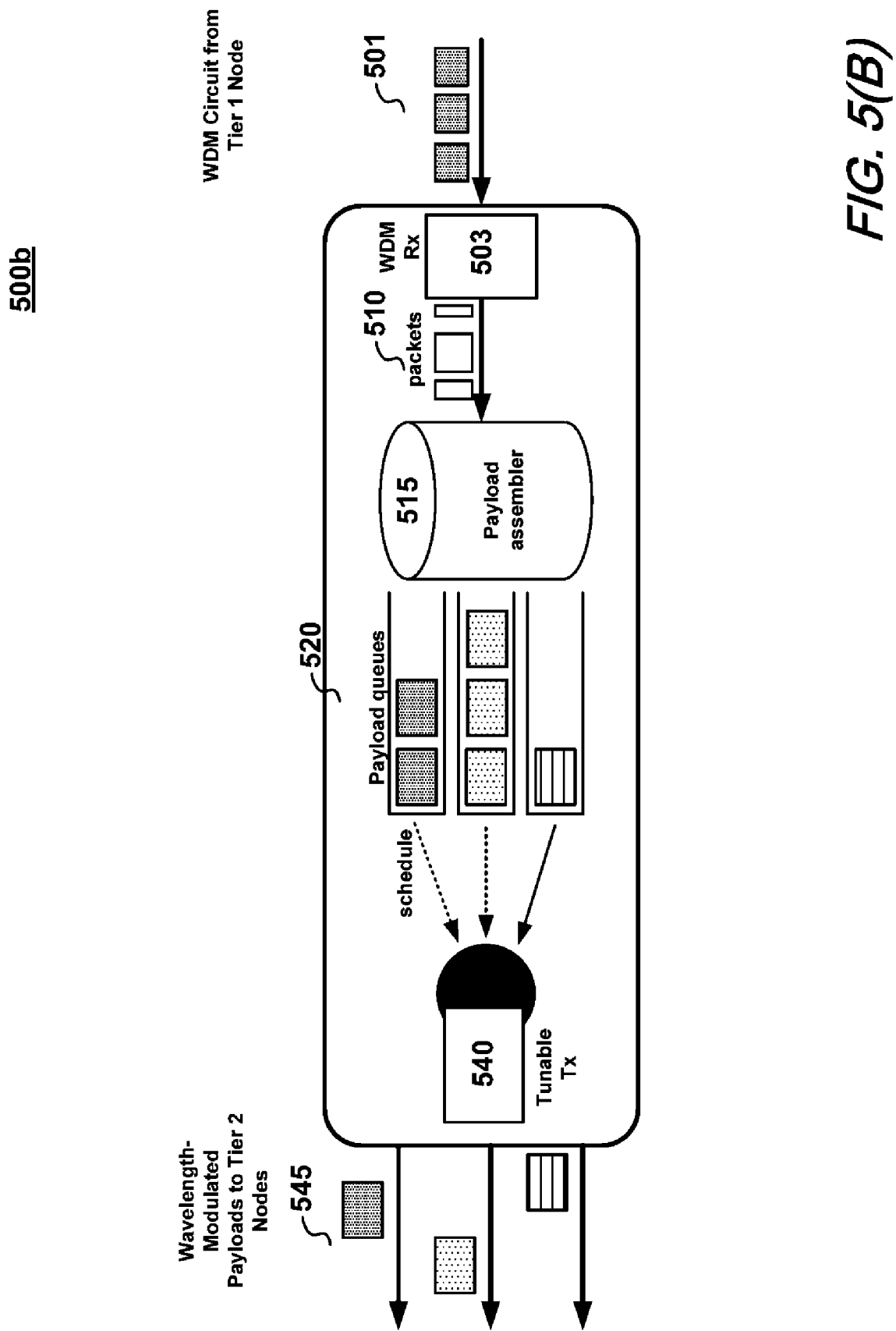
FIG. 5(B) is a schematic diagram of a transceiver at a tier 1 node in a communications network showing its downstream operation and components according to an embodiment of the present invention.

It may be seen with reference to FIG. 5(A) and FIG. 5(B) that the operation of a tier 1 node transceiver is complementary to that just described. In particular, FIG. 5(B) shows the downstream process for a tier 1 node 500($b$). Data received at tier 1 node via WDM circuit 501 from a remote tier 1 node is received by WDM receiver 503 and are disassembled into packets 510. These packets are assembled into payloads and are sorted into destination-specific payload queues 520 by payload assembler 515. All of the data in a given queue are to be forwarded to a particular tier 2 node. The resulting destination-specific queues contain payloads, which are fixed-size data units that take up one time slot in the schedule. Each payload contains data from one or more packets. At each time slot, the tunable transmitter 540 takes a payload from one of the queues 520 and transmits it to a tier 2 node, using a wavelength associated with that particular tier 2 node. The wavelength-modulated payloads 545 are relayed to tier 2 nodes via optical switches and links.

Similarly to the tier 2 node downstream operation as shown in FIG. 4(B), FIG. 5(A) shows the operation of a transceiver at a tier 1 node, processing payloads sent upstream from tier 2 nodes. Wavelength-modulated payloads from tier 2 nodes 550 are filtered through the effect of a wavelength-selective filter 555 and appropriate packets are then received by burst-mode receiver 560 using a preamble sequence transmitted with each of the payload to lock onto its particular timing and amplitude. The receiver then demodulates the payload which is then immediately transmitted by a specific WDM transmitter 590 which in-turn forwards it to the remote tier 1 node associated with that specific transmitter.

As can now be readily appreciated, the scheduler is responsible for coordinating the timing of payload transmissions. Each schedule allocates a number of slots from each transmitter in the overall system to each receiver—thereby establishing sub-wavelength circuits having an individual bandwidth proportional to the number of slots allocated. When the desired bandwidth of a sub-wavelength circuit is changed, the schedule is updated and subsequently distributed to all schedule participants.

An important constraint according to the present invention is that no transmitter may transmit more than one payload at a time, and no receiver can receive more than one payload at a time. Advantageously, and because a tier 1 node may be used as a synchronization point, the scheduler does not need to account for propagation delay between the each of the tier 2 nodes and the tier 1 node. And while a tier 2 node may home to multiple tier 1 nodes, it uses different transceivers to do so. Advantageously, this means that the schedules associated with different tier 1 nodes can be determined independently.

Figure 6:
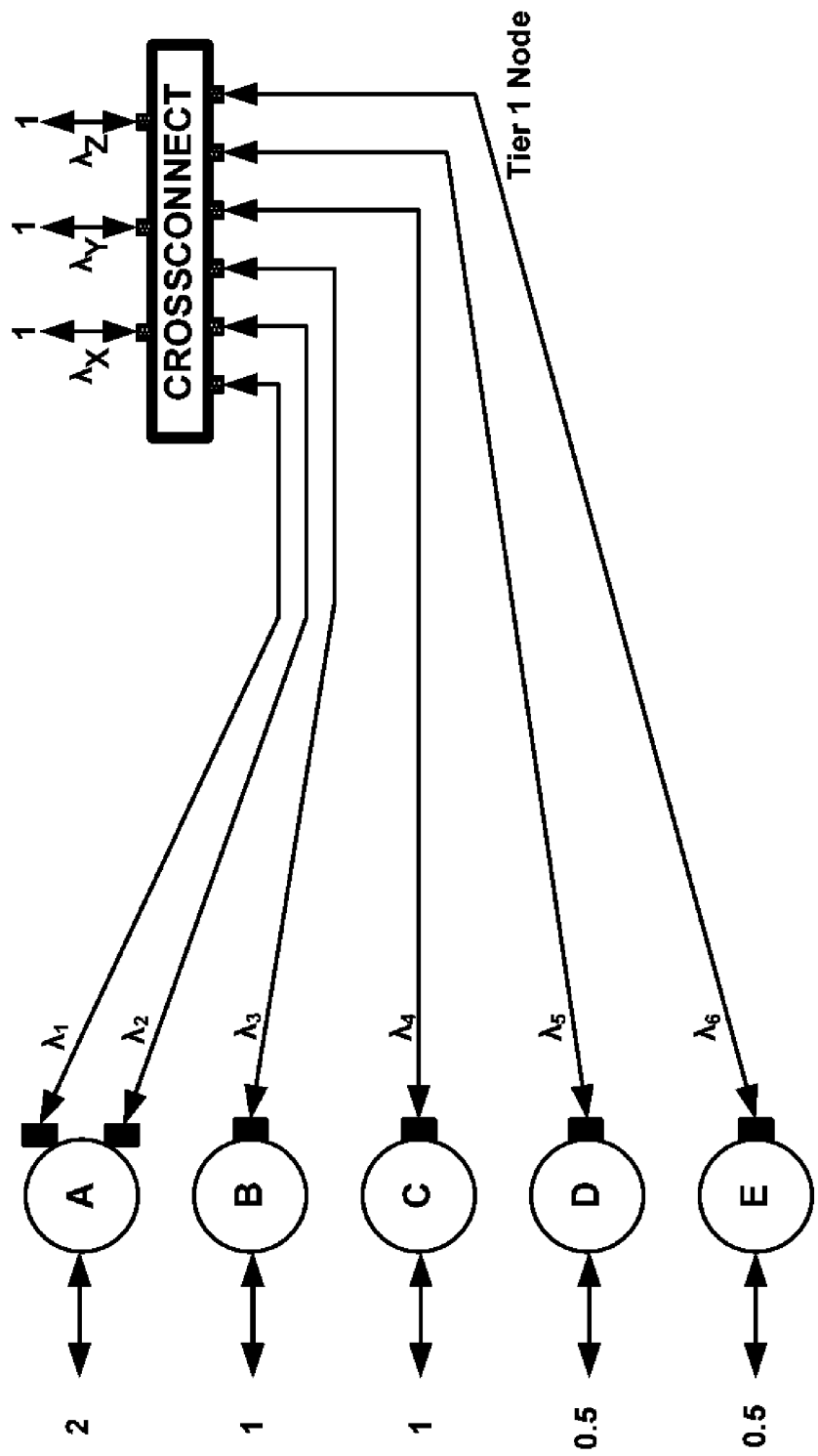
FIG. 6 is a schematic diagram of communications network segment showing six wavelengths used to connect five tier 2 nodes to a tier 1 node via WDM circuits.

With reference now to FIG. 6, it may be seen how networks constructed according to certain aspects of the present invention provide efficient use of wavelength channels during periods of variable traffic conditions.

As can be appreciated, in variable traffic conditions, precise demand levels between node(s) may not be known with precision. Instead, one may have knowledge of the total traffic into or out of a given node or group of nodes, or knowledge of upper bounds on such traffic.

For example, consider the scenario shown in FIG. 6 which depicts a portion of a two-tiered network system in which five tier 2 nodes (A, B, C, D, E) exhibiting respective loads are homed to a single crossconnect which—as we have shown before—is paired with a local tier 1 node (not specifically shown). For the purposes of this example, if we assume that the system has 10 Gb/s channels, then a load of 0.5 (nodes D, E) refers to 5 Gb/s.

Now, consider that all traffic is bidirectional, and that the maximum load engineered/provisioned for each of the five tier 2 nodes A, B, C, D, E is 2, 1, 1, 0.5 and 0.5 respectively and that the maximum traffic load from all five tier 2 nodes collectively is 3. In a typical WDM system, six transceivers are needed at the tier 2 nodes—2 at A, and 1 at B, C, D, and E, while six transceivers are needed at the tier 1 node/crossconnect (to terminate the six wavelength channels $\lambda_1, \lambda_2, \lambda_3, \lambda_4, \lambda_5, \lambda_6,$) while three more are needed to handle tier 1-to-tier 1 traffic $\lambda_X, \lambda_Y, \lambda_Z$. Of course, the particular topology of the tier 2 node-to-tier 1 node network is not shown in this FIG. 6, but it could be any of a variety known in the art, e.g., ring, tree, or mesh.

Figure 7:
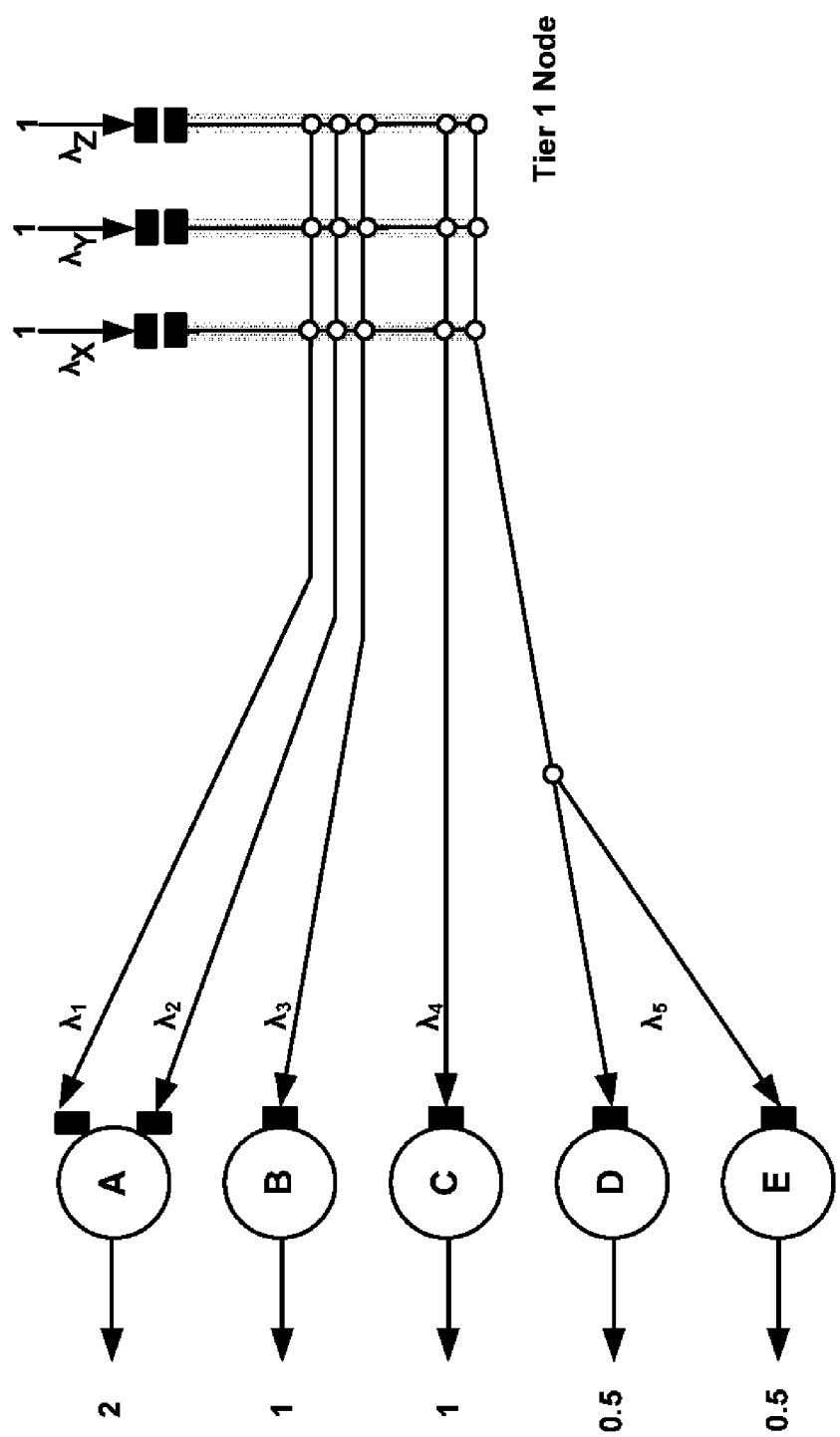
FIG. 7 is a schematic diagram communications network segment showing five wavelengths used to connect five tier 2 nodes for the tier 1-to-tier 2 downlink according to an embodiment of the present invention.

Turning now to FIG. 7, there is shown a scenario—according to an aspect of the present invention—wherein the tier 1 node is connected to five tier 2 nodes A, B, C, D, E via only five wavelength channels ($\lambda_1, \lambda_2, \lambda_3, \lambda_4, \lambda_5$). The tier 1 node receives traffic from three remote tier 1 nodes over three wavelength channels $\lambda_X, \lambda_Y, \lambda_Z$. As depicted in this FIG. 7, since satellites/nodes D and E each impose only 0.5 load on the network system, they can advantageously share a wavelength channel namely, $\lambda_5$. Operationally, and as can be now appreciated, each of the two tier 1 nodes (D and E) would demodulate all received bursts on that fifth wavelength channel $\lambda_5$, but would ignore those bursts not intended for itself.

Figure 8:
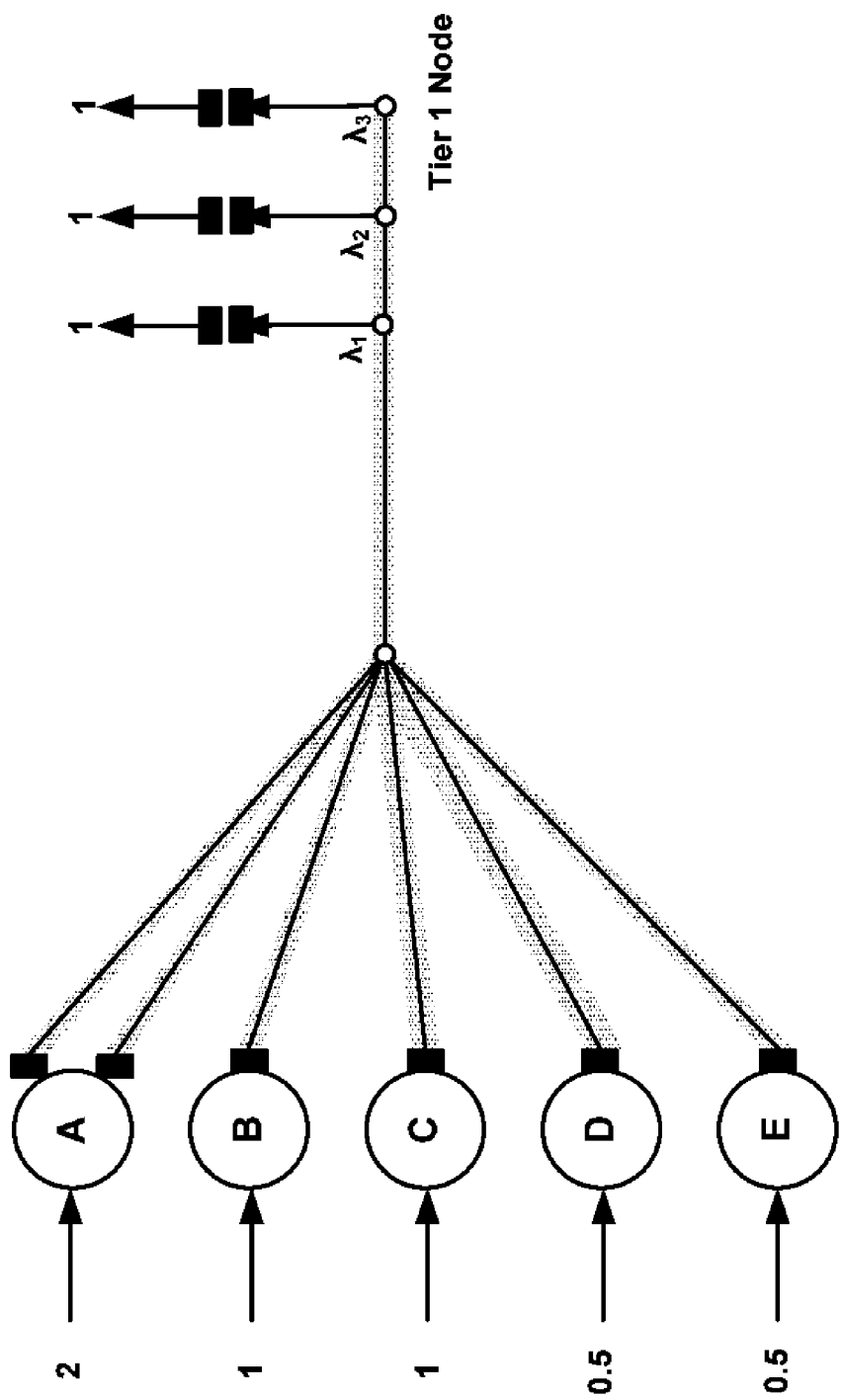
FIG. 8 is a schematic diagram communications network segment showing three wavelengths used for tier 2-to-tier 1 uplink according to an embodiment of the present invention.

The upstream operation of the scenario of FIG. 7 is shown in FIG. 8. With reference to that FIG. 8, there it may be observed that only three wavelength channels $\lambda_1, \lambda_2, \lambda_3$ are required for upstream operation as all six transmitters on the five tier 2 nodes A, B, C, D, E share access to the three wavelengths to send data to the three tier 1 nodes transceivers.

At this point, while we have discussed and described the invention using some specific examples, those skilled in the art will recognize that our teachings are not so limited. Accordingly, the invention should be only limited by the scope of the claims attached hereto.

The invention claimed is:

1. A telecommunications network comprising:
    a plurality of tier 2 nodes;
    a plurality of tier 1 nodes;
    wherein each one of the tier 2 nodes is in optical communication with one or more of the tier 1 nodes via a time and wavelength interleaved arrangement and each of the tier 2 nodes includes a tunable transmitter for transmitting wavelength-modulated payloads to tier 1 nodes; and
    wherein each one of the tier 1 nodes is in optical communication with one or more of the other tier 1 nodes via a wavelength-division-multiplexed arrangement and each of the tier 1 nodes includes
        a burst-mode receiver which receives transmissions from a tier 2 node at a particular wavelength and a WDM transmitter that re-transmits those transmissions to an appropriate tier 1 node at another particular wavelength associated with that appropriate tier 1 node.

2. The network of claim 1 wherein each of the tier 2 node further comprises:
    a transceiver including:
        a payload assembler for sorting received packets into a number of destination-based queues in which all payloads contained within a given queue are to be forwarded by a local tier 1 node to a same remote tier 1 node;
        a scheduler for scheduling the transmission of the queued payloads; and
        a tunable transmitter for transmitting the payloads as determined by the scheduler.

3. The network of claim 2 wherein each destination-based payload queue has associated with them a particular wavelength at which its associated payload is transmitted to a particular transceiver on a local tier 1 node, where the particular transceiver is associated with that wavelength.

4. The network of claim 3 wherein each payload is a fixed-size data unit that is transmitted in one time slot associated with the scheduler and tunable transmitter.

5. The network of claim 1 further comprising:
    one or more optical switches interposed between one of the tier 2 nodes and a tier 1 node.

6. A telecommunications network comprising:
    a plurality of tier 2 nodes;
    a plurality of tier 1 nodes;
    wherein each one of the tier 2 nodes is in optical communication with one or more of the tier 1 nodes via a time and wavelength interleaved arrangement; and
    wherein each one of the tier 1 nodes is in optical communication with one or more of the other tier 1 nodes via a wavelength-division-multiplexed arrangement
    wherein each tier 2 node includes
        a wavelength-selective filter for filtering wavelength-modulated payloads transmitted by a tier 1 node to the tier 2 node; and
        a burst mode receiver which receives the filtered payloads and demodulates the payload according to a preamble sequence within each payload.

7. The network of claim 6 wherein each of the tier 1 nodes includes:

a wavelength-selective filter for filtering wavelength-modulated payloads transmitted from a tier 2 node to the tier 1 node;

a burst mode receiver for demodulating the payload according to a preamble sequence transmitted with the payload;

a WDM transmitter for transmitting the payload to a remote tier 1 node associated with that specific transmitter.

8. The network of claim 7 wherein each of the tier 1 nodes further includes:

a WDM receiver for receiving packets sent from remote tier 1 nodes via WDM circuits;

a payload assembler for assembling received packets into payloads wherein each of the payloads are placed into destination-specific payload queues;

a scheduler for determining when a particular payload is to be transmitted as a fixed-size data unit in one time slot on the schedule; and a transmitter for transmitting a payload from a queue as determined by the scheduler wherein the transmitted payload is forwarded to a particular tier 2 node, the particular tier 2 node being determined by the wavelength used for transmission.

9. A method of operating a telecommunications network comprising:

a plurality of tier 2 nodes; and a plurality of tier 1 nodes;

said method comprising the steps of:

transmitting one or more data packets from a tier 2 node to a tier 1 node via an optical communication path employing a time and wavelength interleaved communications scheme; and further transmitting the one or more data packets from the tier 1 node to another tier 1 node via an optical communication path employing a wavelength-division multiplexed communication scheme wherein said transmitting of the data packet from the tier 2 node to the tier 1 node further comprises the step of tunably transmitting wavelength modulated data to the tier 1 nodes; and wherein said further transmitting step comprises the steps of receiving the data packets transmitted from the tier 2 node at a particular wavelength and re-transmitting those data packets to the another tier 1 node using a particular wavelength associated with that another tier 1 node.

10. The method of claim 9 where said transmitting of the data packet from the tier 2 node to the tier 1 node further comprises the steps of:

sorting received packets into a number of destination-based queues in which all payloads contained within a given queue are to be forwarded by the local tier 1 node to the same remote tier 1 node;

scheduling the transmission of the queued payloads; and tunably transmitting the payloads as determined by the scheduler.

11. The method of claim 10 wherein each of the payloads are fixed size data units and are transmitted in one time slot associated with the scheduling and transmitting.

12. The method of claim 9 wherein said further transmitting comprises the steps of:

filtering through the effect of a wavelength-selective filter wavelength modulated data packets transmitted from the tier 2 node to the tier 1 node;

demodulating the packets according to a preamble sequence transmitted with the data packets; and transmitting the data packets to the another tier 1 node through the effect of a specific transmitter associated with that another tier 1 node.

13. The method of claim 12 further comprising the steps of:

receiving at the another tier 1 node by a WDM receiver the packets transmitted by the tier 1 node;

assembling the received packets into payloads wherein each of the payloads are placed into destination specific payload queues;

scheduling when a particular payload is to be transmitted as a fixed-size data unit in one time slot according to a scheduler; and transmitting the payload from a queue as determined by the scheduler wherein the transmitted payload is forwarded to a particular tier 2 node, the particular tier 2 node being determined by the wavelength used for transmission.

14. The method of claim 9 further comprising the steps of:

one or more optical switches interposed between one of the tier 2 nodes and a tier 1 node.

* * * * *